Patented Dec. 14, 1937

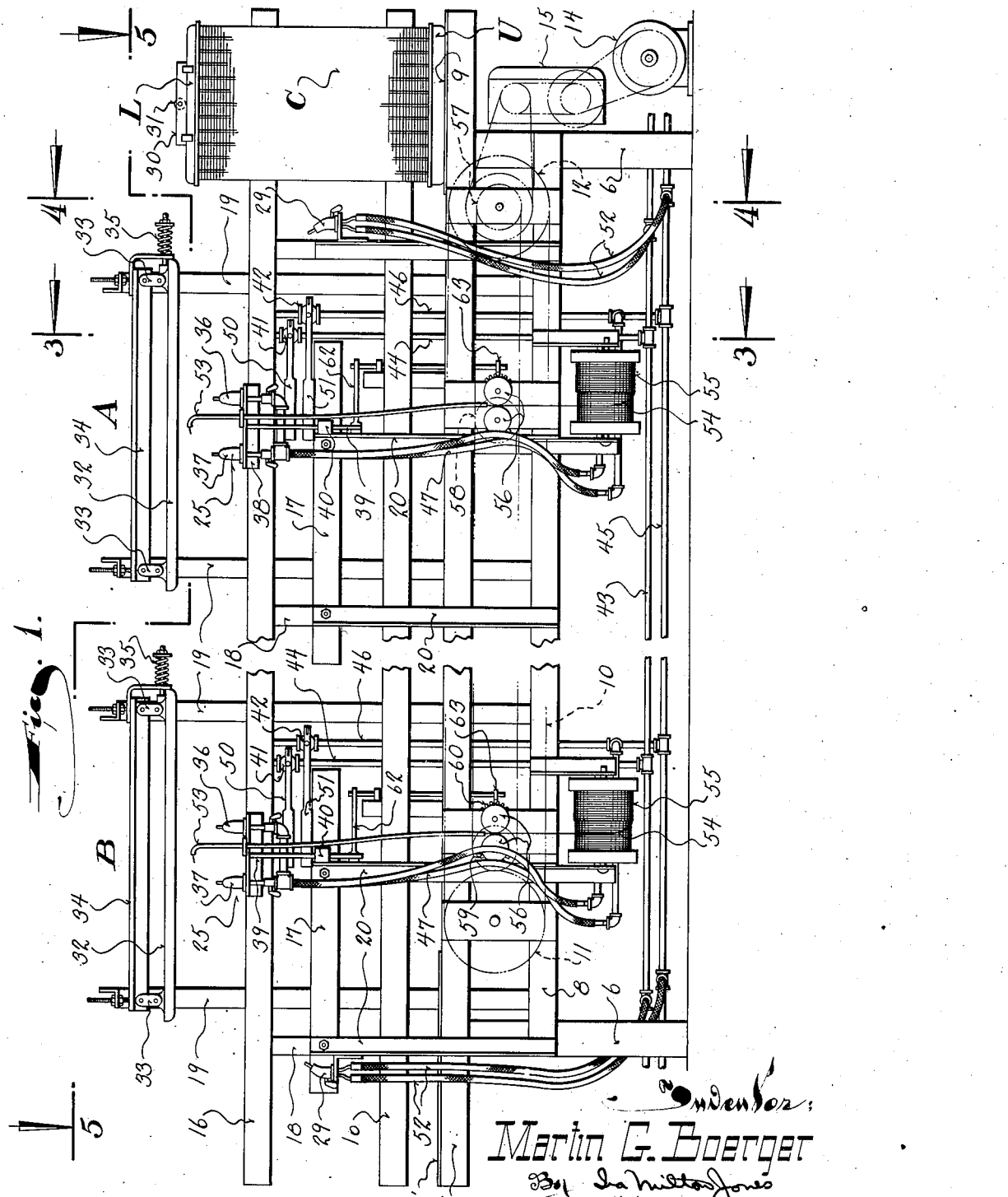

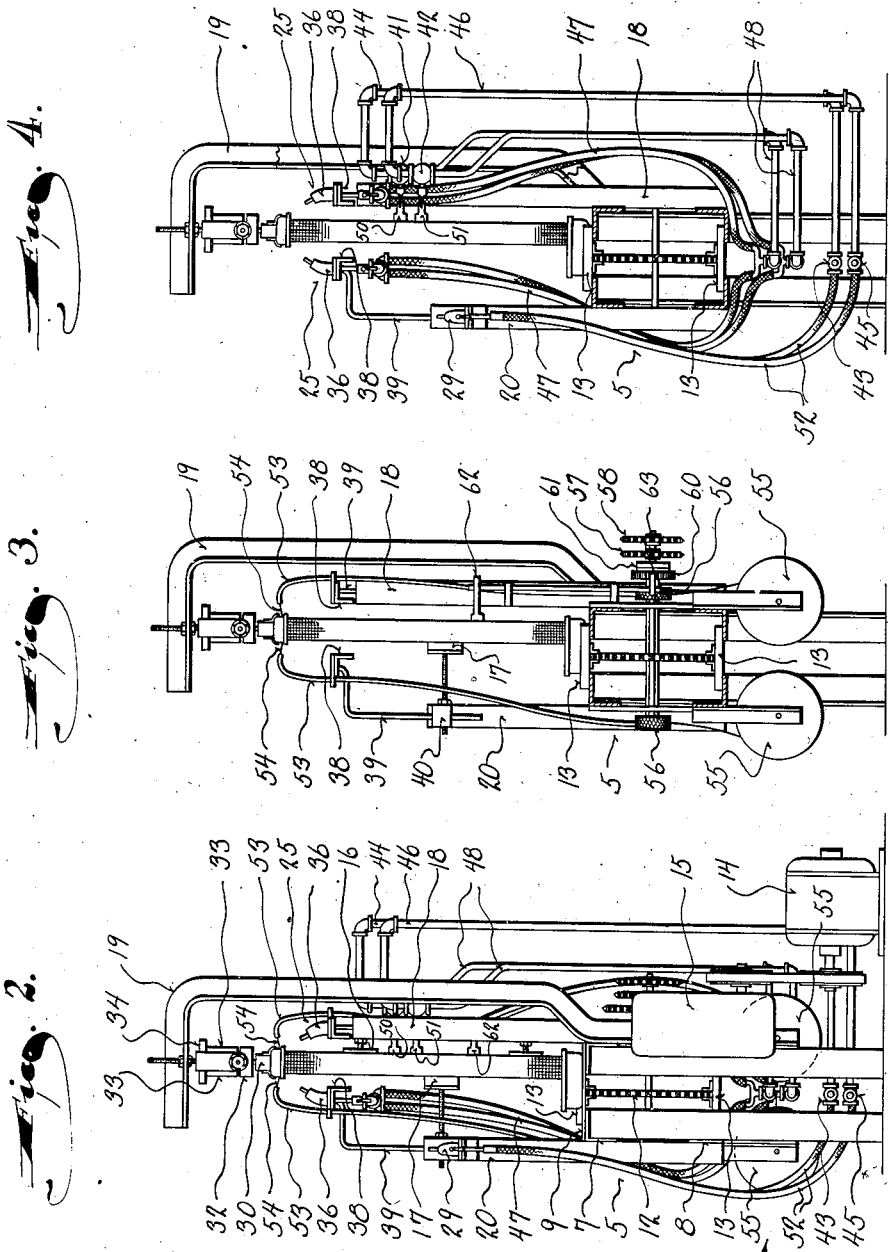

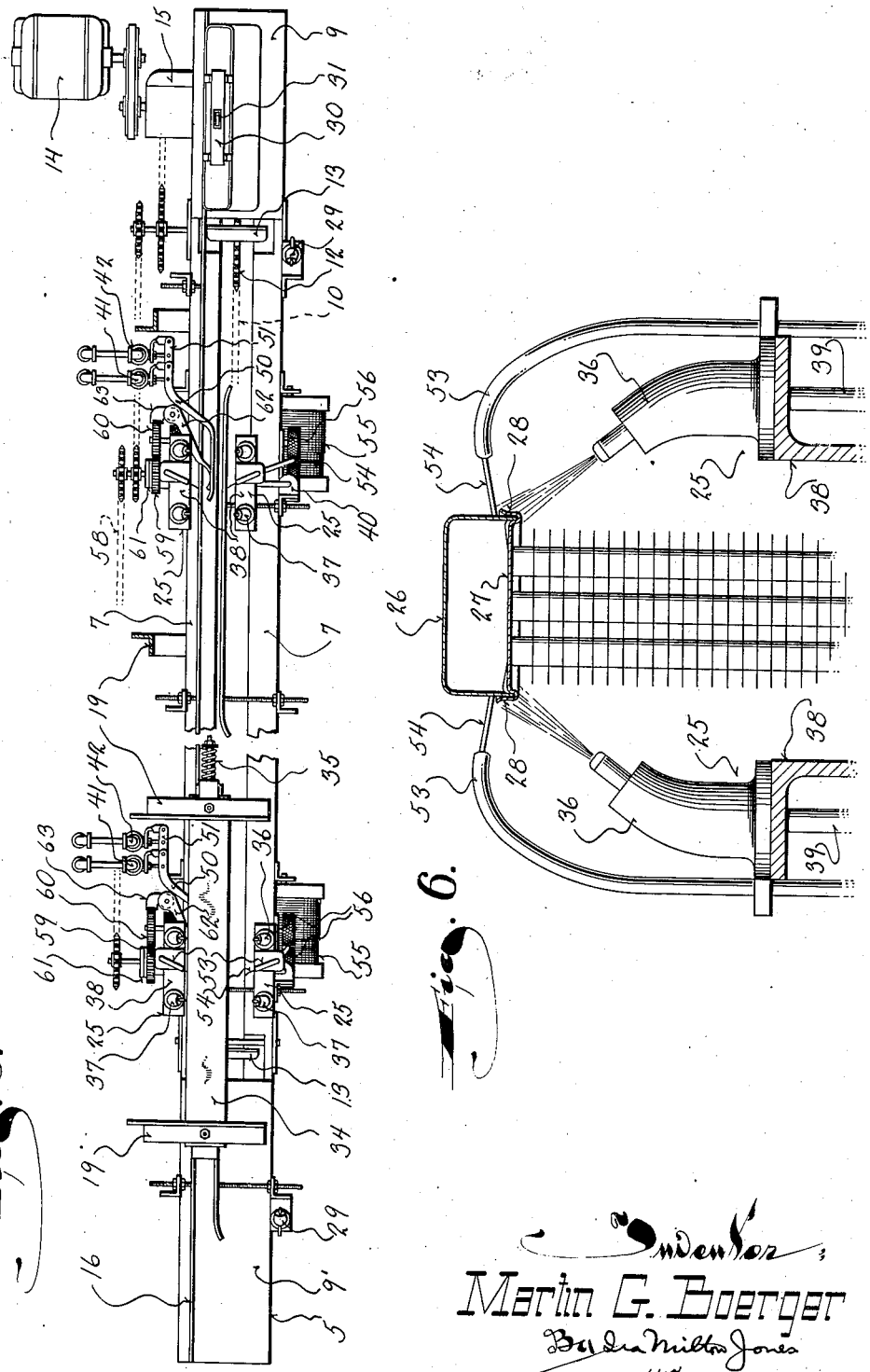

2,101,929

UNITED STATES PATENT OFFICE 2,101,929

SOLDERING MACHINE

Martin G. Boerger, Racine, Wis., assignor to Modine Manufacturing Company, Racine, Wis., a corporation of Wisconsin Application September 16, 1936, Serial No. 101,123

5 Claims. (Cl. 113—59)

This invention relates to soldering machines and refers particularly to equipment for soldering the component parts of radiator core headers where they are of stamped sheet metal construction. These headers consist of a box-like head and a plate closing the open face thereof. The plate is permanently secured to the tubes of the core and subsequently the box-like head is soldered to the plate.

Obviously it is essential that the junction between these parts be permanently secure. This requires uniformity in the soldering operation which heretofore has been difficult to attain especially with production methods of manufacture.

It is therefore an object of the present invention to provide a soldering machine which permits a more or less continuous soldering of the headers of radiators and which is so designed that the solder joints are uniform and assure a permanently secure junction.

More specifically it is an object of this invention to provide a machine of the character described in which a radiator core is conveyed along a defined path past a soldering station at which point soldering mechanism is automatically set in operation to heat the parts to be soldered and feed the required amount of solder thereto.

Another object of this invention is to provide a machine of the character described which is adjustable to cores of different sizes.

Another object of this invention is to provide in a single machine, mechanism for soldering both the lower and upper headers of the cores.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a front elevation of a soldering machine constructed in accordance with this invention with the intermediate portion thereof broken away;

Figure 2 is an end view of the machine;

Figure 3 is a cross section view taken through Figure 1 on the plane of the line 3—3, showing particularly the manner of feeding the solder;

Figure 4 is a cross section view taken through Figure 1 on the plane of the line 4—4 and showing specifically the manner in which the burner heads are mounted and supplied with fuel;

Figure 5 is a top view of the machine partially in section as indicated by the line 5—5 in Figure 1; and Figure 6 is an enlarged section view through the portion of the radiator core illustrating the manner in which the soldering operation is done.

Referring now particularly to the accompanying drawings in which like numerals indicate like parts throughout the several views, the numeral 5 designates a bench which forms the main supporting structure for the machine and which consists of suitable legs 6 joined by longitudinal rails 7 and 8. The front and rear upper rails 7 are joined at their opposite ends by plates which provide loading and unloading platforms 9 and 9' respectively to support the radiator cores C as shown in Figure 1.

Mounted in the bench structure is an endless conveyor 10 indicated by construction lines in Figure 1 and comprising a chain trained about sprocket wheels 11 and 12 journalled in bearings carried by the bench. At spaced intervals the chain of the conveyor has pusher members 13 attached thereto which travel along the upper surfaces of the rails 7 to push the radiator cores along the length of the bench.

The conveyor is driven in any suitable manner as by an electric motor 14 drivingly connected to a transmission box 15 which in turn has a driving connection with the sprocket wheel 12 of the conveyor. The transmission box 15 also provides a drive for a solder feed mechanism as will be hereinafter more fully described.

Extending along the back of the machine and above the bench are longitudinal guide rails 16 against which the radiator core is held by front guides 17 as the core travels past the two soldering units "A" and "B". The longitudinal rails 16 are adjustably carried by upright supports 18 projecting up from the bench.

The forward guides 17 are adjustably supported from upright supports 20 also fixed to the bench structure, in position to hold the cores against the rear guide rails 16. Through the adjustable mounting of both the front and rear guides cores of different thickness are readily accommodated.

The two soldering units "A" and "B" are identical in construction except for the adjustment in the distance between their respective burner heads 25 inasmuch as the unit "A" acts on the header "L" at one end of the core while the unit "B" acts on the other and wider header "U" at the opposite end of the core.

As best shown in Figure 6 the headers "L" and "U" of the radiator core which are alike except as to their width, consist of a box like head 26 and a plate 27 fitted over the open face thereof.

The plate 27 is fixed to the tubes of the core and has its marginal edges provided with a continuous channel 28 to receive the marginal edges of the head portion 26. During the soldering operation the header being acted upon is always uppermost so that solder will flow down into the channel 28.

It is to be observed that only the long edges of the junction are soldered automatically, the transverse portions or ends of the header being soldered manually, and to facilitate such manual soldering a manually operable burner 29 is provided for each soldering unit.

In preparing the cores for passage through the machine their headers "L" and "U" are assembled and then with the core resting on the loading platform 9 as shown in Figure 1, an anti-friction shoe 30 is applied to the uppermost header. This shoe fits the top header in such a manner as to be held against displacement and has a roller 31 projecting thereabove for engagement with a presser bar 32 supported from the overhanging portions of supports 19 extending upwardly from the rear of the bench.

The presser bar 32 is suspended by two pivoted links 33 from a cross bar 34 which is adjustably supported by the overhanging portions of the supports 19. A spring 35 yieldingly maintains the presser bar 32 in its lowermost position so that as the core is advanced under the presser bar it is lifted against the action of the spring 35 whereby the presser bar firmly holds the core down on the conveyor and also maintains the component parts of the header being soldered in proper assembled relationship.

The burner heads 25 each comprise a leading and a trailing burner nozzle 36 and 37 respectively. These nozzles are spaced apart along the path of the core so that one acts on the core in advance of the other. Both nozzles are mounted on a cross piece 38 which is adjustably supported by a rod 39 slidable in a fixed bearing 40.

Both nozzles of each burner head are supplied with fuel and air under the control of automatic valves 41 and 42. The valve 41 is connected with a main fuel supply line 43 through a pipe 44 and the valve 42 is connected with a main air supply line 45 through a pipe 46. The opposite ends of the valves are connected with hose lines 47 through piping 48 which hose lines lead to the burner heads as shown.

The valves 41 and 42 have appropriate bypass openings (not shown) so as to permit pilot flames to burn continuously at the burner nozzles, and when fully open permit the full volume of fuel and air to flow to the nozzles to project flames from the nozzles to impinge the header of the core passing between the burner heads.

The valves 41 and 42 are automatically opened by the advancing cores through the medium of levers 50 and 51 respectively which as best shown in Figure 5 have their outer free ends projecting into the path of the advancing cores to be actuated by the cores.

The manual burner nozzles 29 are connected directly by hose lines 52 to the main supply lines 43 and 45.

The burner heads besides mounting the nozzles 36 and 37 also hold a solder feed tube 53 in proper adjusted position so that solder 54 in the form of wire which, as is customary, has a flux core, is properly fed to the header of the core. As shown in Figure 6, the outer end of the solder wire has a wiping engagement with the vertical side walls of the header at a point directly above the channels 28 so that as the solder melts it runs down into the channels.

The solder is fed from spools 55 mounted in the lower portion of the bench. Complementary knurled feeder wheels 56 driven from the transmission box 15 through chain and sprocket connections 57 and 58 feed the wire as required. Meshing gears 59 and 60 are incorporated in the drive for the feeder wheels, one of which, in the present instance the gear 59, is driven by a friction clutch 61 so that it may be restrained against rotation to control the functioning of the solder feed. This control is effected automatically and while it may be accomplished in any desired manner, a pivoted lever 62 is here provided for this purpose. The free end of the lever lies in the path of the advancing core and the opposite end thereof forms a dog 63 engageable with the teeth of the gear 60 to hold the same against rotation except when the lever 62 is actuated by an advancing core. Upon disengagement of the dog 63 from the gear 60 the feeder wheels are driven to project the solder wire up through the tube 53 to its point of use.

*Operation*

With the drive motor 14 in operation and the burners lit so that a small pilot flame burns at each one of them, a core with its headers "L" and "U" properly assembled is placed on the loading platform 9 as shown in Figure 1. Then with the anti-friction unit properly positioned on the upper header, the core is pushed onto the conveyor 10 so that one of its pusher members 13 will engage the trailing end of the lower header and advance the core across the length of the bench.

As the core moves under the presser bar 32 of the soldering unit "A" the roller 31 of its anti-friction unit will be engaged to hold the core firmly down on the conveyor and maintain the component elements of the upper header in proper assembled relationship.

As the core continues to advance, the levers 50 and 51 are actuated to open the valves 41 and 42 whereupon flames are projected from the burner nozzles 36 and 37. These nozzles are so adjusted that the flames projected therefrom impinge the lower edges of the header as shown in Figure 6 thus heating the same sufficiently to melt the solder which is fed against the side wall of the header at a point between the flames of the two burners. In this manner the metal of the header parts is heated to proper temperature before the application of the solder and again after the application of the solder so as to insure that the solder will flow uniformly into the channels 28 and thus provide a secure joint.

At the same time the long side edges of the header are being soldered automatically the operator using the manual nozzle 29 solders the short ends of the header.

When the core has passed through the soldering unit "A" it is inverted to dispose its other header "U" uppermost and replaced onto the conveyor to be advanced into the soldering unit "B". A suitable roller structure is applied to the header "U" before the core enters the soldering unit "B".

The operation and functioning of the unit "B" is identical with that of the unit "A" and when the core leaves the unit "B" and arrives at the discharge platform 9' both its headers are properly soldered.

From the foregoing description taken in connection with the accompanying drawings, it will be readily apparent to those skilled in the art to which this invention appertains, that this invention provides an automatic soldering machine whereby the component parts of radiator core headers are quickly soldered and that the solder joints formed are uniform and permanently secure.

What I claim as my invention is:

1. In a soldering machine, the combination of two spaced burner nozzles, means for normally supplying sufficient fuel to the nozzles to maintain a pilot flame, means for supplying an increased volume of fuel to the nozzles to cause flames to be projected therefrom, normally closed valves for controlling the supply of fuel to the nozzles, spaced wire solder feeds for feeding wire solder to points adjacent the flames, means for carrying a radiator core between the nozzles and the solder feeds in such a manner that the solder has a wiping engagement with the opposite sides of one header of the core adjacent a junction in said header and the flames projected from the nozzles impinge the portions of the header adjacent the point of wiping engagement of the solder therewith, and means operable by the advance of the core for opening said valves and controlling the feeding of the solder.

2. In a machine for soldering the junction between two component parts of a radiator core header, one of which has a marginal channel in which the marginal edges of the other part is received, a conveyor for advancing the core through the machine with the header to be soldered held so that the channel of its junction opens upwardly and the long edges of the junction are exposed at opposite sides and lie substantially parallel to the line of advance, burner nozzles for projecting flames simultaneously onto both of the long edges of the junction as the core is advanced to heat the same, means to feed wire solder into wiping engagement with the opposite sides of the header above the open top of the channel subsequently to the heating thereof so that the solder flows down into the channels, other burner nozzles to reheat the long edges of the junction after the application of the solder thereto to cause the solder to flow uniformly over the entire junction, and control means for the burner nozzles and the solder feed including actuators lying in the path of the advancing core so that the advance of the core automatically controls the functioning thereof.

3. In a soldering machine of the character described, a conveyor for carrying parts to be soldered along a horizontal path with the junction between the parts lying in a horizontal plane, automatically operable means for heating the junction of said parts and for applying solder thereto, and pressure applying means for holding the parts together during the soldering of the junction thereof, said last named means comprising a fixed support above the conveyor, a pressure bar, a pair of pivoted links suspending the bar from said fixed support and forming therewith a parallelogram so that the bar is at all times in a horizontal position, and spring means yieldingly maintaining the pressure bar in its lowermost position so as to apply downward pressure on said parts as they are advanced under said bar.

4. In a machine for soldering the junction between the component parts of a radiator core header, an elongated horizontal supporting table adapted to hold a radiator core in upright position with the header to be soldered uppermost, an endless conveyor movable along said supporting table to advance a radiator core along the table, front and back horizontal guide rails between which the radiator core advances and by which it is held in an upright position, a downwardly acting clamping member supported above the table to press down onto the uppermost header to hold its component parts properly assembled, a pair of nozzles adapted to project heating flames against opposite sides of the header as it moves under said downwardly acting clamping member, and means for feeding wire solder against the side walls of the header adjacent to the junction between its two component parts subsequent to the heating thereof by the flames projected from said nozzles.

5. In a machine for soldering the longitudinal edges of a radiator core header, an elongated horizontal supporting table having a loading platform at one end to receive a radiator core in upright position, an endless conveyor having flights movable along the length of the supporting table inwardly of said loading platform to advance a radiator core pushed onto the conveyor from said platform, front and rear horizontal guide tracks between which the radiator core moves and by which it is held in an upright position, an elongated presser bar to press down on top of the uppermost header to hold its component parts firmly together preparatory to soldering the same, pivoted links from which said presser bar is suspended to swing endwise and upwardly from its lowermost position, a spring yieldingly maintaining said presser bar in its lowermost position, a pair of nozzles mounted at opposite sides of the path of the radiator core and arranged to direct heating flames against the opposite side walls of the header to be soldered, and means for feeding wire solder against said opposite sides of the header adjacent to the junction between its component parts, said presser bar being so located with respect to the solder feeding means and being sufficiently long to hold the header parts firmly together during the solder application and until the solder has set.

MARTIN G. BOERGER.